Oct. 30, 1945.     E. A. BLACK     2,387,737
TENSIOMETER
Filed Jan. 10, 1945
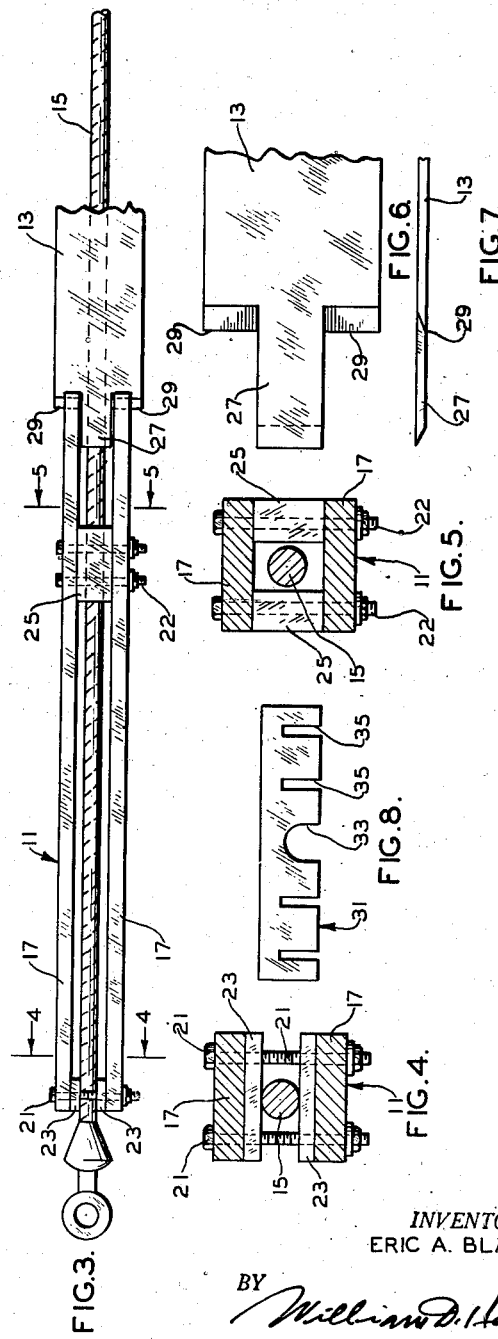
INVENTOR.
ERIC A. BLACK
BY *William D. Hall*
ATTORNEY Patented Oct. 30, 1945

2,387,737

UNITED STATES PATENT OFFICE 2,387,737

TENSIOMETER

Eric A. Black, Red Bank, N. J.

Application January 10, 1945, Serial No. 572,203

6 Claims. (Cl. 73—143)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to gauges and more particularly to means for adjusting the tension on guys and the like.

Guys, such as those used to steady tall towers and masts, should preferably be subjected to a determinable tension, and the tension on the guys on opposite sides should be equalized.

The common practice in tightening guys is to adjust them by eye and touch, which obviously is highly unsatisfactory. Some devices for accurately adjusting the tension of guys have been devised, but have involved relatively complicated mechanisms and meters and in some instances require that more than one anchorage be installed for each guy.

It is an object of the present invention to provide a tensioning gauge which may be applied to a guy at any conveniently available portion thereof, and which requires no extra anchorages or changes in any parts.

It is a further object to provide such a gauge which may be left in place or removed, as desired, and which will in no way interfere with the guy, so that the gauge does not become a permanent part of the guy, but may be used on any number of guys.

It is a further object to provide such a gauge which need require no special or expensive parts, but which may be readily fabricated of ordinarily available materials.

In general the preferred embodiment comprises two thin, elongated spring strips of springy material, which are disposed in bows along opposite sides of a guy by a pair of clamps secured to the said guy when in its slack condition. As the guy is stressed, the distance between the clamps increases causing a decrease in the rise of the bows. Such decrease being a function of the tensional stress applied to the guy, the amount of said stress is readily ascertainable.

For a better understanding of the invention, together with further and other objects thereof, reference is had to the following description, taken in connection with the accompanying drawing, and its scope will be pointed out in the claims.

In the drawing,

Figure 1 is an elevational view of the preferred form of the present invention, in operational position upon a horizontally disposed guy;

Figure 2 is an enlarged elevational view of one of the clamps of the gauge shown in Figure 1;

Figure 3 is a plan view of the clamp of Figure 2;

Figures 4 and 5 are further enlarged sectional views, along the lines 4—4 and 5—5 respectively, of Figure 3;

Figure 6 is a plan view, drawn to the same scale as Figures 4 and 5, of one end of the upper spring strip of Figure 3;

Figure 7 is an elevational view of the spring strip of Figure 6; and

Figure 8 is a plan view of one form of scale which may be used in connection with the gauge shown in the other figures.

The tensioning gauge shown in the drawing comprises two clamps 11 and two spring strips 13. The clamps 11 are secured to a guy 15 as will hereinafter appear. Each clamp 11 comprises a pair of stiff flat elongated plates 17 of metal, preferably steel, each of which plates is generally rectangular in shape, but has two V-shaped notches 19 at one end.

The two plates 17 of each clamp 11 are disposed in spaced parallel relationship and are joined by two pressure bolts 21 and four spacer bolts 22, which extend through both plates 17 and are provided with suitable lock washers and nuts.

Set back a short distance from the ends of the plates 17 which are provided with the V-notches 19, and interposed between the said plates, are a pair of spacer blocks 25 (Figures 3 and 5). The spacer blocks 25 are rectangular slabs, preferably of steel, and are disposed longitudinally along opposite edges of and between the two plates 17. Each spacer block 25 is pierced by two holes to receive two of the spacer bolts 22. Said spacer blocks 25 are of a greater thickness than the guy 15, and said blocks are spaced from each other a distance greater than the diameter of the said guy, so that the guy is entirely free to move longitudinally between said plates and said spacer blocks.

Interposed between the plates 17, at the other end thereof, are two pressure strips 23 (Figures 3 and 4), preferably of some relatively soft metal, such as soft copper, to avoid injury to the guy 15 which is clamped therebetween. Said pressure strips 23 are disposed transversely to the plates 17 and are pierced by two holes to receive the pressure bolts 21.

Each of the spring strips 13 is a flat, relatively thin, elongated leaf of elastic material, such as spring steel. The ends (Figures 6 and 7) of said spring strips 13 are cut to form two transverse lateral shoulders and a central tongue 27. Both shoulders are bevelled to form knife edges 29 and the end of each tongue 27 is also bevelled (as may be clearly seen in Figure 7). The transverse width of each tongue 27 is just slightly less than the thickness of the spacer blocks 25, so that the tongue may move freely between the plates 17, as will become clearer hereinafter.

A scale 31 (Figure 8) may be used with the gauge just described. It is a flat strip of any suitable material, such as sheet steel, and is provided along one edge with a central indentation 33 large enough to receive the guy 15 and with a plurality of slots 35 wide enough to receive the spring strips 13.

To use the gauge illustrated to measure the tension applied to a guy 15, one of the clamps 11 is secured to the guy while the latter is in its unstressed state, one plate 17 and one pressure strip 23 of said clamp being removed for this purpose. As the pressure bolts 21 are then taken up, the pressure strips 23 will tightly grip the guy 15 therebetween. The second clamp 11 is then placed upon the guy 15 at a point spaced from the first clamp, the V-notches 19 of the two clamps facing each other. Before the pressure bolts 21 of said second clamp 11 are tightened, the clamp is moved to such a position along the guy relative to the first clamp that the spring strips 13 may be put into place so that they are outwardly bowed with a predetermined amount of rise. The pressure bolts 21 of the second clamp 11 are then tightened to secure said clamp to the guy at that point. In positioning the spring strips 13, they are disposed on opposite sides of the guy 15 and in planes normal to the plates 17. The tongues 27 are inserted between the pairs of plates 17 and the knife edges 29 are snapped into the V-notches 19.

Each knife edge 29 rides in the apex of one of the V-notches 19 of the plate 17 as the spring strip 13 is bowed during the operation of the gauge. The end of the tongue 27 is bevelled so that the tongue will not impinge against the guy 15 irrespective of the amount of rise to which the spring strips 13 are subjected during operation. It is advantageous to have the tongues as long as possible so as to hold the spring strips 13 in place during their installation and the operation of the gauge.

The proper amount of bow of the spring strips 13 may be measured in any suitable manner. The simplest and preferred method, when a predetermined tension is to be applied to a guy, is to use the simple scale 31 shown in Figure 8. When using such a scale the second clamp 11 is adjusted to such a longitudinal position along the guy 15 that the midpoints of the two bowed spring strips 13 can slip into the two outermost slots 35 of said scale, whereupon said second clamp is made fast to the guy by means of its pressure bolts 21.

The gauge is then in operating position on the relaxed guy 15, but is fastened to it at only two points, namely, at the pairs of pressure strips 23 of the two clamps 11. The scale 31 is then removed and tensional stress is applied to the guy 15. As the tension is increased the guy 15 stretches. The increase in length of the guy 15 between the two sets of pressure strips 23 will result in a reduction in the rise of the two spring strips 13. When the distance between the bows has been reduced to a predetermined amount, the guy will have been subjected to a predetermined amount of tension. Thus, the tension is increased until the amount of rise has been reduced to the proper value. If the preferred scale 31 aforementioned is used to measure the rise, the stress on the guy 15 will be increased until the midpoints of the spring strips 13 slip into the inner slots 35 of said scale.

In order to ascertain the relationship between the tension applied to the guy and the rise of the spring strip, it is first necessary to determine the relationship between the said tension and the stretch, due to such tension, of the particular guy being used. This may be done mathematically from the formula, $$\Delta L = \frac{TL}{EA}$$

in which
  $\Delta L$ is the increase in length,
  $T$ is the tension,
  $L$ is the length,
  $E$ is the elastic modulus of the guy, and
  $A$ is the cross sectional area of the guy.

The relationship between the rise of the spring strip and the length of the guy may then be ascertained from the formula, $$s - l = \frac{8 \times f^2}{3 \times l}$$

in which
  $s$ is the arc length,
  $l$ is the chord length, and
  $f$ is the rise (or distance between midpoints of the chord and arc).

As $s$ is the actual length of the unbowed spring strips, it is therefore always known.

To illustrate the procedure, a gauge actually constructed as described above will be referred to. In said embodiment the distance between the pairs of pressure strips 23, with the spring strips 13 unbowed, was 100 inches, the length of each spring strip, from knife edge to knife edge, was 55 inches and the transverse distance between the knife edges of the two spring strips was 2 inches. The guy wire to be stressed was stranded wire having an elastic modulus of 18,000,000 pounds per square inch, and a cross sectional area of .34 square inch. It was desired to apply a tension of 4500 pounds to the guy.

By use of the first formula set forth above, it was ascertained that, if a 4500 pound tension were applied, the guy wire between pairs of pressure strips 23 would be stretched .075 inch. It was, therefore, decided to adjust the spring strips so that their chord length would be shorter than their arc length by an amount slightly greater than said amount of .075 inch. The amount chosen was .1 inch.

By using the second formula set forth above, it was found that the rise of each spring strip, when the guy was unstressed, would be $1\frac{7}{16}$ inches. Therefore, the distance between the midpoints of the two spring strips would be twice $1\frac{7}{16}$ inches plus 2 inches or $4\frac{7}{8}$ inches.

When the guy wire was tensioned until its length between the pairs of pressure strips was increased by .075 inch, the rise of each spring strip, ascertained by the second formula set forth above, would be $\frac{11}{16}$ inch, and the distance between the midpoints of the two spring strips would be twice $\frac{11}{16}$ inch plus 2 inches or $3\frac{3}{8}$ inches.

Hence, in the use of said gauge, it was fastened to the slack guy wire so that the distance between spring strips was $4\frac{7}{8}$ inches. Tension was then applied to the guy wire until the distance between spring strips decreased to $3\frac{3}{8}$ inches, whereupon it was known that the guy wire was subjected to a tension of 4500 pounds.

While there has been described what at present is considered a preferred embodiment of the present invention it will be obvious to those skilled in the art that various changes and modifications may be made therein without departing from the invention and it is, therefore, aimed in the appended claims to cover such changes and modifications as fall within the true spirit and scope of the invention.

What is claimed is:

1. A gauge to determine tension upon a guy comprising two clamps adapted to fasten said gauge to said guy at two points, spaced from each other, while the guy intermediate said points is straight, and a spring strip sustainable in the form of a bow by said clamps, the amount of rise of said bow being dependent upon the distance between the said points at which the gauge is fastened and said gauge being removable from said guy when the guy is under tension.

2. A gauge to measure tension on a guy comprising a bowable spring strip, two clamps, each of said clamps being provided with means to grip the guy and means to pivotably sustain one end of said spring strip, whereby the two clamps may be secured to the guy at a plurality of positions relative to each other, the amount of bow of the spring strip being dependent upon the relative positions along the guy of said clamps and said gauge being installable upon and removable from said guy without interferring with the tension on said guy.

3. A gauge to measure tension on a guy comprising two clamps and a spring strip, each of said clamps being provided with means to grip the guy at a particular longitudinal position thereof, and means to pivotably support one end of the spring strip, said last mentioned means including a substantially V-shaped notch, said spring strip being an elongated strip of springy material provided with knife edges at both ends, each knife edge being adapted to pivotably ride in one of said notches.

4. A gauge to measure changes in the length of a guy comprising two clamps, each clamp including two members disposed in spaced substantially parallel relationship on opposite sides of said guy and two transverse pressure strips secured between said members and adapted to grip said guy therebetween, spacer means between said plates to keep them spaced sufficiently to allow the guy to move freely longitudinally therebetween except where gripped by said pressure strips, a notch on each of said clamps, an elongated spring strip of springy material, means on each end of said spring strip adapted to pivotably ride in one of said notches to allow the spring strip to assume a plurality of bowed positions, a tongue on each end of said spring strip adapted to slidably fit between the two members of each clamp aforesaid to help support said spring strip, and means to measure changes in the rise of said spring strip.

5. A gauge to measure tension on a guy comprising two clamps, and a spring strip, each of said clamps being provided with means to grip the guy at a particular longitudinal position thereof and means to pivotably support one end of the spring strip, said spring strip being an elongated strip of springy material.

6. A gauge to measure changes in the length of a guy comprising two clamps, each clamp including two members disposed in spaced substantially parallel relationship on opposite sides of said guy; means on said clamp adapted to grip said guy; said guy being freely movable longitudinally relative to said clamps except where gripped by the gripping means aforementioned; an elongated spring strip of springy material; means to pivotably sustain the ends of said spring strip upon said clamps to allow the spring strip to assume a plurality of bowed positions; and means to measure changes in the rise of said spring strip.

ERIC A. BLACK.